June 2, 1959     D. A. HARGRAVE     2,888,811
FROZEN FOOD DISPLAY CABINET AND COVER THEREFOR
Filed March 21, 1957     2 Sheets-Sheet 1
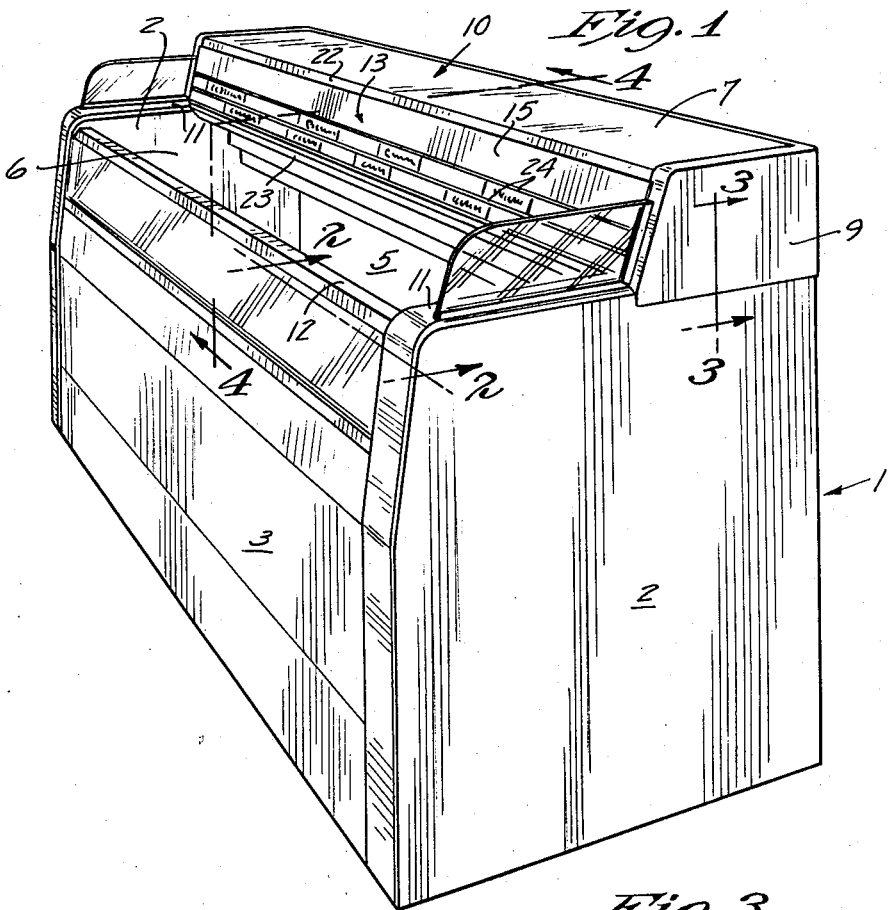
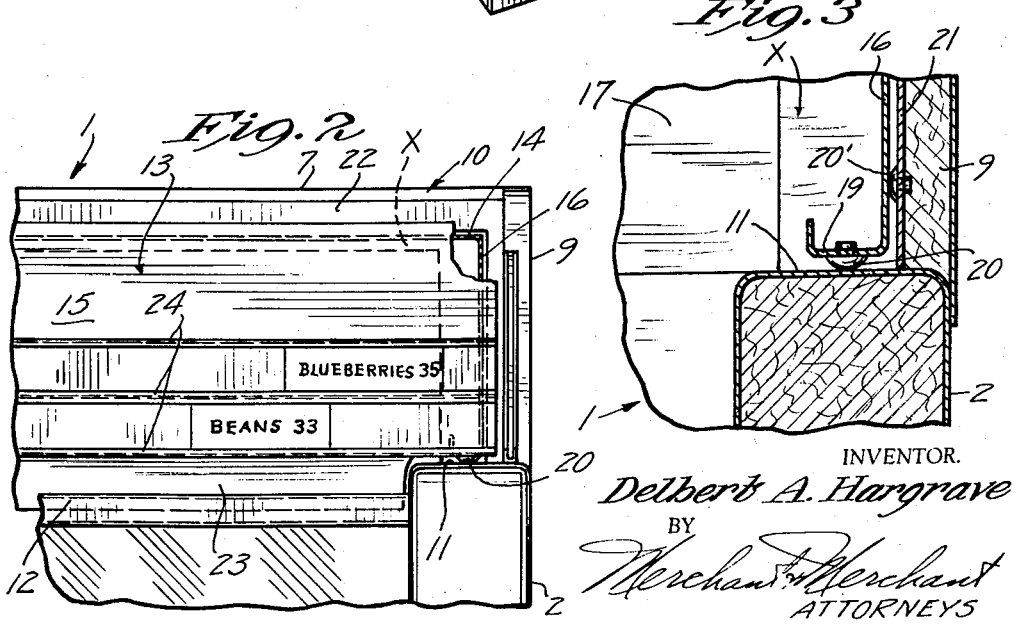
INVENTOR.
Delbert A. Hargrave
BY
ATTORNEYS

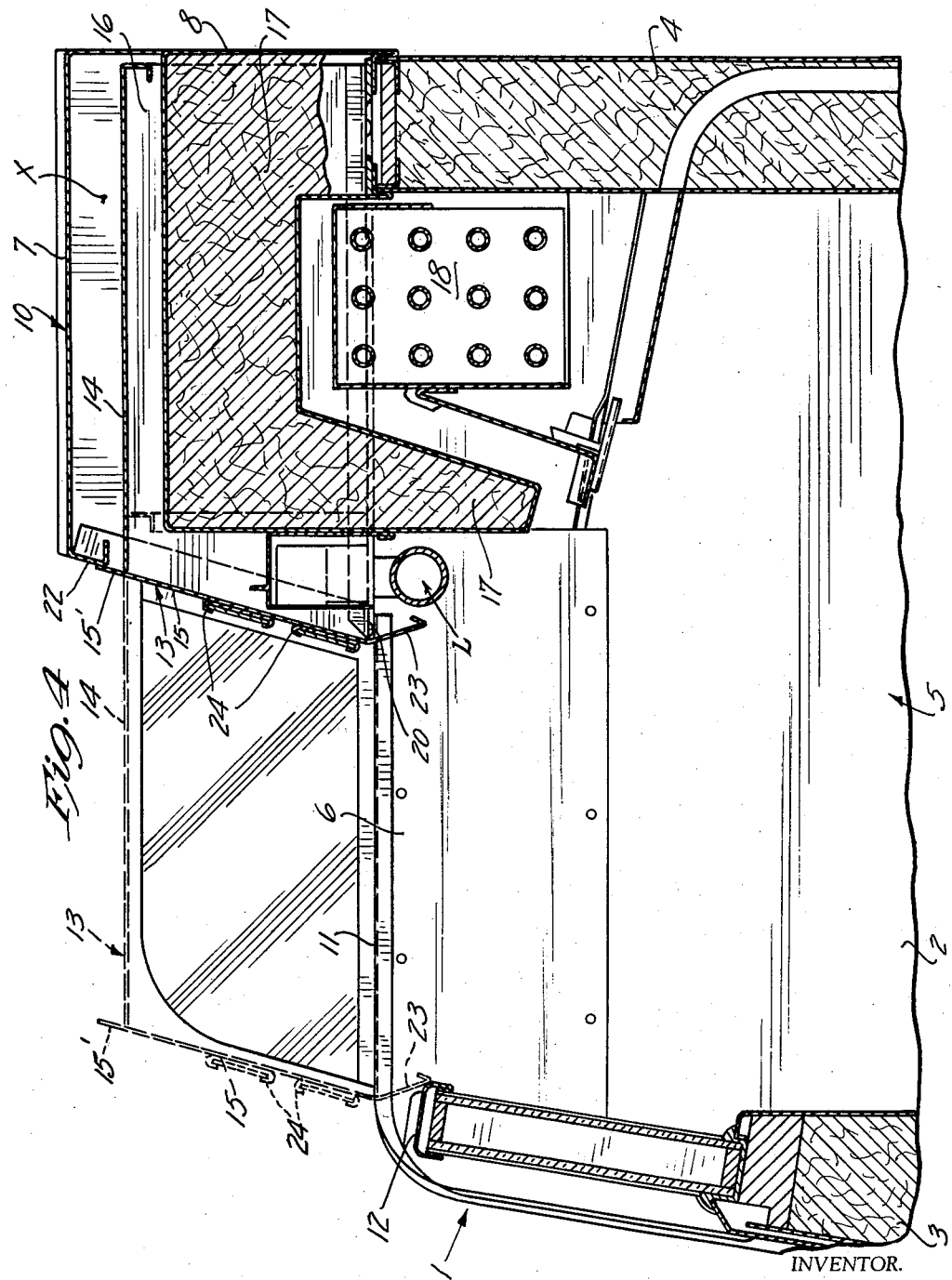

United States Patent Office 2,888,811
Patented June 2, 1959

2,888,811

FROZEN FOOD DISPLAY CABINET AND COVER THEREFOR

Delbert A. Hargrave, Minneapolis, Minn., assignor to Schaefer Inc., Minneapolis, Minn., a corporation of Minnesota Application March 21, 1957, Serial No. 647,628

9 Claims. (Cl. 62—255)

My invention relates generally to refrigerated display cases and more specifically to improvements in night covers therefor.

Still more particularly my invention provides a novel hood-shaped night cover for a refrigerated display case having a normally open top food chamber and a forwardly opening hood receiving housing intermediate the side walls of the case and rearwardly of the top opening thereof.

The primary object of my invention is the provision of a night cover for electrically refrigerated food display cabinets of the type immediately above described which cover includes elongated front and top walls and side walls, and which is mounted on the supporting surfaces defined by the side walls of the cabinet for sliding movements from an inoperative position totally receivable within the hood receiving housing to an operative position forwardly of the hood receiving housing and overlying the opening and cooperating with the hood receiving housing to define a box-like closure, for said opening.

A further object of my invention is the provision of a device of the class above described wherein means limiting lateral movement of both the front and rear portions of the hood-shaped night cover when same is in its operative position, is provided.

A further object of my invention is the provision of novel means for limiting forward movements of said hood-shaped night cover beyond its operative position.

A further object of my invention is the provision of a device of the class described wherein the front wall of the night cover provides a very convenient surface upon which to mount identification cards for frozen food products and the like contained within the open top display case.

A still further object of my invention is the provision of a device of the class described which is relatively inexpensive to produce, which is extremely easy to operate and which is highly efficient in its operation.

The above and still further objects of my invention will become apparent from the following detailed specification, appended claims and attached drawings.

Referring to the drawings wherein like characters indicate like parts throughout the several views:

Fig. 1 is a view in perspective of my novel structure with the night cover in inoperative position;

Fig. 2 is an enlarged fragmentary view in front elevation as seen from the line 2—2 of Fig. 1, some parts being broken away and some parts shown in section;

Fig. 3 is an enlarged fragmentary sectional view taken substantially on the line 3—3 of Fig. 1; and Fig. 4 is an enlarged sectional view taken on the line 4—4 of Fig. 1.

Referring with greater particularity to the drawings, the numeral 1 indicates in its entirety a conventional refrigerated display case or cabinet comprising upstanding side walls 2 and spaced front and rear wall members 3 and 4 respectively which define a food chamber 5, the opening of which is identified by the numeral 6.

A top wall element 7, in cooperation with an upwardly extended portion 8 of the rear wall 4 and upwardly extended portions 9 of the side walls 2, defines a forwardly opening hood receiving housing identified in its entirety by the numeral 10.

As shown particularly in Figs. 2 and 3, the upper edges of the side walls 2 of the casing 1 define generally horizontal supporting surfaces 11 which extend rearwardly from the front portions thereof beneath the hood receiving housing 10. Also preferably and as shown, the upper edge 12 of the front wall 3 terminates below the supporting surfaces 11 defined by the upper edges of the side walls 2.

My novel night cover hood for the cabinet above described is identified in its entirety by the numeral 13 and comprises elongated top and front walls 14 and 15 respectively, and side walls 16, all of which are formed from suitable sheet material secured together in any well known manner such as by rivets or welding and said front wall 15 being larger than the interior of the hood defined by the top and side walls 14 and 16 respectively to provide an outwardly extending housing closing flange 15' and a depending apron-like flange 23 later to be described. Cover hood 13 is of a length and of a height to be slidably received within an inverted U-shaped opening X the outer limits of which are defined by the upwardly extended side wall portions 9 and the top wall 7 of the hood receiving housing, and the lower limits of which are defined by the generally inverted U-shaped insulation frame 17 overlying the evaporating coils 18, and the rearward portions of surfaces 11.

As shown particularly in Figs. 2 and 3, the lower end portions of the side wall 16 of the cover 13 are turned inwardly upon themselves to define cross-sectionally channel shaped rails 19 which overlie the supporting surfaces 11. Preferably and as shown particularly by Fig. 3, the rails 19 are provided with spaced anti-friction feet 20 formed from nylon or the like and which rest directly upon the supporting surfaces 11. Also preferably and as shown by Fig. 3, anti-friction buttons 20' formed from nylon or the like are interposed between the inner surfaces 21 of the upwardly extended side wall portions 9 and the side walls 16 of the cover 13. Cover 13 is thus mounted for sliding movements on the supporting surfaces 11 between the inoperative full line position of Fig. 4, within the cover hood receiving housing 10, to the operative position illustrated by dotted lines wherein said cover 13 overlies the opening 6 and cooperates with the housing 10 to provide a box-like enclosure. It will be noted that the rearwardly inclined front wall 15 of the cover 13 projects above the side walls 16 thereof as indicated at 15' and limits inward sliding movements of the cover 13 by engagement with the front portion 22 of the top wall 7, in which position the projecting flange 15' covers and closes the inverted U-shaped hood cover receiving opening X as illustrated by the full line showing of Fig. 4. On the other hand, forward sliding movements of the cover 13, beyond the operative position illustrated by the dotted lines in Fig. 4, is limited by an elongated depending apron 23 which preferably is integrally formed as an extension of the lower edge portion of the front wall 15 of the cover 13. Note that said apron 23 extends substantially between the side walls 2 and 9 of the cabinet 1; and at the inoperative position of cover 13, apron 23 overlies and generally shrouds the usual elongated illumination source indicated generally at L, apron 23, upon sliding the cover hood 13 to night closure or operating position, makes contact with the upper edge 12 of the front wall 3 to effect a crude but suitable seal. Lateral movements of the projected forward end of the cover 13 when in operative position are obviously limited by engagement of the apron 23 with the side walls 2, whereas lateral movements of the rear end portion of the cover 13 are limited by engagement of the side walls 16 and top wall 14 of the cover 13 with the upwardly projecting side wall portions 9.

Aside from being highly efficient in its operation and extremely easy to move between its operative and inoperative positions, night cover 13 is maintained free of condensation and accumulations of frost and/or ice in both its inoperative and operative positions, first, because it is insulated from cold or refrigerated areas of the case. This is accomplished by the elevated form or design of the night cover, wherein at its inoperative position it is insulated from the colder air of the case and coil 18 by the U-shaped insulating frame 17 and at its operative position it is elevated from the colder air of the case and insulated from the colder air of the case by a relatively large layer or area of warmer air adjacent the open top of the cabinet. Second, night cover 13 is preferably positioned and formed to be influenced by heat within the case from the illumination source L and from the generally warmer areas thereof adjacent the open top. This cover hood 13, and particularly the front wall 15 thereof, provides an excellent mounting surface for identification cards for the frozen food products and the like contained within the food chamber 5. As shown particularly in Figs. 2 and 4, this is accomplished by one or more cross-sectionally C-shaped elongated card-receiving guides 24 which are secured to the front surface of the wall 15 in any suitable manner.

My invention has been thoroughly tested and found to be completely satisfactory for the accomplishment of the above objects, and while I have shown a preferred embodiment thereof, it should be obvious that same is capable of considerable modification without departure from the scope and spirit of the appended claims.

What I claim is:

1. In a refrigerated display case comprising spaced upstanding side walls and spaced front and rear walls defining an open top food case, the upper ends of said side walls defining generally horizontal supporting surfaces, the rear wall being of greater height than the sidewalls, the rear portions of the side walls having upwardly diverted extensions, a top wall element extending between the upper ends of the extensions and defining with the rear wall a forwardly opening housing overlying the rear portion of said food case, a cross-sectionally inverted U-shaped evaporator coil-insulating frame within said housing and cooperating therewith to define an inverted U-shaped opening the lower limits of which are defined by said supporting surfaces, a night cover hood comprising elongated top wall and front walls and side walls depending therefrom, said side walls being mounted for sliding movements on said supporting surfaces between an inoperative storage position within said opening with its top wall closely overlying said insulating frame, and an operative food case covering position forwardly of said housing.

2. The structure defined in claim 1 in further combination with means on said cover hood cooperating with the front and side walls of the case limiting forward and lateral movements of said cover when same is in said operative position.

3. In a refrigerated display case comprising spaced upstanding side walls and spaced front and rear walls defining an open top food display case, an evaporator coil-insulating frame of inverted U-shape in cross-section extending upwardly from the rear portion of the case, an open front housing member including a top wall having rear and side walls depending therefrom supported on and extending across the rear portion of the case in spaced relation to the insulating frame and providing therebetween an inverted U-shaped forwardly opening housing, a night cover hood also of inverted U-shaped cross-section telescoped within said housing and including a substantially planar top wall extending across the case and having depending side walls and a front wall, cooperating means on said case and night cover hood for slidably supporting the cover hood on the case for linear movement into said housing wherein the top wall of the cover hood lies between the housing top and the top of the insulating frame, and means on the front wall of the cover hood to close said forwardly opening housing in the operative position of said cover hood and to engage the front wall of the case for limiting forward movement thereof when said cover hood is moved to operative position.

4. The structure defined in claim 3, in which the means on the front wall of the cover hood comprises a depending apron extending between the sides of the case to contact the inner surface of the front wall thereof to form a seal and prevent lateral movement of the cover hood.

5. In a refrigerated display case comprising spaced upstanding side walls and spaced front and rear walls defining therebetween an open top frozen food display case having a food chamber, an inverted U-shaped insulating frame structure defining an insulated refrigerating chamber overlying the rear portion of said food chamber and communicating therewith, a top wall cooperating with said rear wall and upwardly extending rear portions of said side walls of said case to define therebetween a forwardly opening inverted U-shaped housing spaced from and overlying said insulated refrigerating chamber, a slidable night cover hood having an elongated top wall and front and side walls depending therefrom and overlying the open top of said case forwardly of said insulated refrigerating chamber, and cooperating means on said case and cover hood for slidably supporting said cover hood for linear movement into said housing in spaced relation to the walls thereof.

6. The structure defined in claim 5, in which said cover hood has marginal means to engage and close said forwardly opening housing when said cover hood is in inoperative position.

7. The structure defined in claim 5, in which the front wall of said cover hood has marginal means to engage and close the front wall of said case when said cover hood is in operative position.

8. The structure defined in claim 7, in which the marginal means comprises in part a flange-type skirt, and said marginal means engaging said case to limit its sliding movements in operative as well as inoperative positions and to direct air rising from said case to the space within said hood and its forwardly opening housing.

9. The structure defined in claim 7, in which said marginal means on said cover engages and closes said forwardly opening housing when said cover hood is in inoperative position.

References Cited in the file of this patent

UNITED STATES PATENTS

| | | |
|---|---|---|
| 1,033,331 | Lobenstein | July 23, 1912 |
| 2,494,528 | Winskowicz | Jan. 10, 1950 |
| 2,504,520 | Greiling | Apr. 18, 1950 |
| 2,773,357 | Canter | Dec. 11, 1956 |

FOREIGN PATENTS

| | | |
|---|---|---|
| 112,776 | Switzerland | Nov. 16, 1925 |
| 1,082,766 | France | Jan. 3, 1955 |